US007415527B2

(12) United States Patent
Varadarajan et al.

(10) Patent No.: US 7,415,527 B2
(45) Date of Patent: Aug. 19, 2008

(54) SYSTEM AND METHOD FOR PIECEWISE STREAMING OF VIDEO USING A DEDICATED OVERLAY NETWORK

(75) Inventors: Sridhar Varadarajan, Bangalore (IN); Korrapati Kalyana Rao, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 848 days.

(21) Appl. No.: 10/460,368

(22) Filed: Jun. 13, 2003

(65) Prior Publication Data

US 2004/0255323 A1 Dec. 16, 2004

(51) Int. Cl.
*G06F 15/16* (2006.01)
(52) U.S. Cl. ...................... 709/231; 709/236
(58) Field of Classification Search .................. 725/94, 725/98, 115; 709/231, 236, 227
See application file for complete search history.

(56) References Cited

U.S. PATENT DOCUMENTS

| | | | | |
|---|---|---|---|---|
| 5,544,327 A * | 8/1996 | Dan et al. | ................... | 709/234 |
| 5,808,607 A * | 9/1998 | Brady et al. | ................. | 715/756 |
| 5,838,687 A * | 11/1998 | Ramfelt | ....................... | 370/443 |
| 5,982,780 A * | 11/1999 | Bohm et al. | ................. | 370/450 |
| 6,195,680 B1 * | 2/2001 | Goldszmidt et al. | ......... | 709/203 |
| 6,275,470 B1 * | 8/2001 | Ricciulli | ...................... | 370/238 |
| 6,438,596 B1 * | 8/2002 | Ueno et al. | .................. | 709/226 |
| 6,502,139 B1 * | 12/2002 | Birk et al. | .................... | 709/233 |
| 6,909,726 B1 * | 6/2005 | Sheeran | ....................... | 370/468 |
| 7,154,898 B1 * | 12/2006 | Pecus et al. | ................. | 370/401 |
| 2002/0103919 A1 * | 8/2002 | Hannaway | ................... | 709/231 |
| 2003/0101253 A1 * | 5/2003 | Saito et al. | .................. | 709/223 |

* cited by examiner

*Primary Examiner*—Krisna Lim
(74) *Attorney, Agent, or Firm*—Venable LLP; Catherine M. Voorhees (57) ABSTRACT

The main challenge in providing video on demand service is to meet the quality of service requirements under the conditions when both server and network are loaded. Disclosed is a system and method for meeting this challenge by using a streaming overlay network with edge and core nodes, by the determination of best possible path for bulk copying of a video data based on location information of the nodes thereby distributing load across the network, by the simultaneous frame streaming and bulk copying of a video data, by the caching of a video data in the overlay network, and by the streaming of the video data to a client from an edge node that is close to the client.

6 Claims, 13 Drawing Sheets

PWVS SYSTEM ARCHITECTURE

FIG. 1: PWVS SYSTEM ARCHITECTURE

FIG. 2: PWVS NETWORK ARCHITECTURE

FIG. 2A: SON HIERARCHICAL NETWORK

FIG. 3: TYPICAL SEQUENCE FLOW

FIG. 4: DATABASE TABLES

FIG. 5: INTERACTIVE VIDEO CLIENT

FIG. 5A: VIDEO ON DEMAND SERVICE

FIG. 6: BULK COPYING

FIG. 7: FRAME STREAMING

FIG. 8: ROUTING TABLE MANAGEMENT

FIG. 9: BANDWIDTH MANAGEMENT

FIG. 10: TOKEN MANAGEMENT

FIG. 11: ROUTE DETERMINATION

FIG. 12: CACHE MANAGEMENT

SYSTEM AND METHOD FOR PIECEWISE STREAMING OF VIDEO USING A DEDICATED OVERLAY NETWORK

FIELD OF THE INVENTION

The present invention relates to video streaming in general, and more particularly, video streaming under network and server loaded conditions. Still more particularly, the present invention relates to a system and method for piecewise streaming of video using a dedicated overlay network.

BACKGROUND OF THE INVENTION

Video on demand as a service needs adequate infrastructure (network and servers) to meet Quality of Service (QoS) requirements. Relevant QoS parameters are time to start of the video and sustainable frame rate. Both these parameters are affected when a server that is to stream a video to a client and a network through which the server and the client are connected are loaded. However, the absolute loading of the network is relatively infrequent and it is useful to deploy approaches that exploit the network as a whole thereby overcoming the bottleneck due to relative loading situations. Relative loading indicates that the select paths in the network are overloaded while the rest of the paths are not so loaded. The approaches that exploit the network as a whole offers several advantages including being able to meet QoS requirements under trying conditions, being able to provide a best possible interactive environment for interacting with the video servers, and being able to enhance the return on investment on network and server infrastructure.

A network that supports video streaming can either be a public, general purpose network or a dedicated, special purpose network. Taking into account the cost of providing Video on Demand (VoD) services, it is essential to deploy a suitable mix of public and private networks. The dedicated network is primarily used to address the requirements related to the core activity of the VoD service while the public network is used for meeting the non-core activities of the video-service. A way to effectively meet the core activity of the VoD service is to determine a best possible path for streaming video when the network is loaded. There are several approaches for determining the best possible path and as this path determination is done in real-time, the deployed approach must be quite efficient. Furthermore, the overall approach must be scalable as the resource requirements of a deployed service normally increases with time.

Caching provides an additional way for effectively utilizing the network infrastructure. Caching of the video data helps in reducing the load on the video server as well as on the network. By using the cache effectively along with the point of presence of nodes of the dedicated network, it is possible to offer the video service in a best possible manner.

DESCRIPTION OF RELATED ART

U.S. Pat. No. 6,195,680 to Goldszmidt; German Sergio (Dobbs Ferry, N.Y.); Willebeek-LeMair; Marc Hubert (Yorktown Heights, N.Y.); Hon; Kenneth Sau-yee (Mid-Levels, HK) for "Client-based dynamic switching of streaming servers for fault-tolerance and load balancing" (issued on Feb. 27, 2001 and assigned to International Business Machines Corporation (Armonk, N.Y.)) describes a client based system for the fault tolerant delivery of real-time or continuous data streams such as real-time multimedia streams. Multimedia servers are grouped into two or more sets wherein the first set includes one or more primary servers and the second set includes one or more secondary servers. The client receives a stream directly from a selected primary server. On automatic detection of load imbalance and/or failures, the client dynamically switches to a secondary server in order to continue receiving of the real-time multimedia with minimal disruption.

U.S. Pat. No. 6,275,470 to Ricciulli; Livio (Los Gatos, Calif.) for "On-demand overlay routing for computer-based communication networks" (issued on Aug. 14, 2001 and assigned to Digital Island, Inc. (San Francisco, Calif.)) describes an approach for dynamically discovering and utilizing an optimized network path through overlay routing for the transmission of data. A determination whether to use default network path or to instead use an alternate data forwarding path through one or more overlay nodes is based on real-time measurement of costs associated with the alternate paths, in response to a user request for transmission of message data to a destination on the network. The system chooses best path among the default forwarding path and the multiple alternate forwarding paths.

U.S. Pat. No. 6,502,139 to Birk; Yitzhak (Hod Hasharon, Ill.); Mondri; Ron (Haifa, Ill.) for "System for optimizing video on demand transmission by partitioning video program into multiple segments, decreasing transmission rate for successive segments and repeatedly, simultaneously transmission" (issued on Dec. 31, 2002 and assigned to Technion Research and Development Foundation Ltd. (Haifa, Ill.)) describes a system and method for near video on demand transmission of a program from a server to multiple clients. The program is partitioned into multiple segments and each segment is transmitted at different transmission rates. The transmission of segments is scheduled in a manner that minimizes the aggregate transmission bandwidth subject to constraints related to client parameters such as client storage capacity and client recording rates.

Xu Lin and Ivan Stojmenovic in "GPS based distributed routing algorithms for wireless networks" (appeared in 2000, unpublished manuscript) describe a location based geographic distance routing algorithm. When a source node wants send a message to a destination node, it forwards the message to an intermediate neighboring node that is closest to the destination node among all neighbors of the source node and this is repeated until eventually the destination node is reached.

Young-Bae Ko and Nitin H. Vaidya in "Location-Aided Routing (LAR) in Mobile Ad Hoc Networks" (appeared on October, 1998 in Proceedings of the Fourth Annual ACM/IEEE International Conference on Mobile Computing and Networking) describe a fully distributed routing protocol in a wireless ad hoc network based on the direction of destination. This paper suggests an approach to utilize location information to limit the search for a new route to a smaller request zone of the ad hoc network, thereby significantly reducing the number of routing messages.

The known systems do not address the issue of effective utilization of an overlay network to stream videos to the demanding clients under the conditions when both network and server are loaded. The disclosed invention provides with a system in which an overlay network infrastructure is efficiently utilized by using a location based routing approach and utilizes the video server infrastructure efficiently by (a) streaming from the edge nodes of the overlay network; and (b) transparently switching from one edge node to another.

SUMMARY OF THE INVENTION

Meeting the QoS requirements of a video service under the conditions when both network and server are loaded is a difficult task. The present invention provides a system and method for effectively utilizing the server resources by streaming the video from the edge nodes of a dedicated streaming overlay network and the network infrastructure is utilized effectively by using the location based bandwidth allocation and management, and piecewise streaming, thereby addressing the issues related to QoS under loaded conditions.

One aspect of the invention is to provide a method for using a hierarchical streaming overlay network to support scalability to accommodate a large number of video servers and video clients.

Another aspect of the invention is to provide a method for a video server to interact with a pre-defined edge node of a streaming overlay network on receiving a request for a video from a client and to transfer the video file to the edge node on demand.

Another aspect of the invention is to provide a method for a video client to receive a requested video from multiple servers during the course of video streaming.

Yet another aspect of the invention is to provide a method for an edge node to bulk copy a video file to another edge node by utilizing one or more intermediate core nodes in such a way that the available bandwidth is maximally utilized and the file gets copied in a shortest possible time.

Yet another aspect of the invention is to provide a method for a streaming overlay network to stream a video file to a video client in such a way that the streaming gets started as quickly as possible.

Another aspect of the invention is provide a method for routing table management in an edge node of a streaming overlay network in such a way that the routing table at any point in time denotes an accurate description of the available bandwidth between any pair of neighboring nodes in a streaming overlay network.

Yet another aspect of the invention is to provide a method for maintaining a routing table in an edge node of a streaming overlay network in such a way that the routing table in edge nodes of the streaming overlay network are in sync with each other.

Another aspect of the invention is to provide a method for location based routing to determine a best possible path within a streaming overlay network so that the load gets distributed across the streaming overlay network.

Another aspect of the invention is to provide a method for cache management to store video data across a streaming overlay network so that video streaming of a video data in response to a request from a client gets started as quickly as possible.

DETAILED DESCRIPTION OF THE PREFERRED EMBODIMENTS

Figure 1:
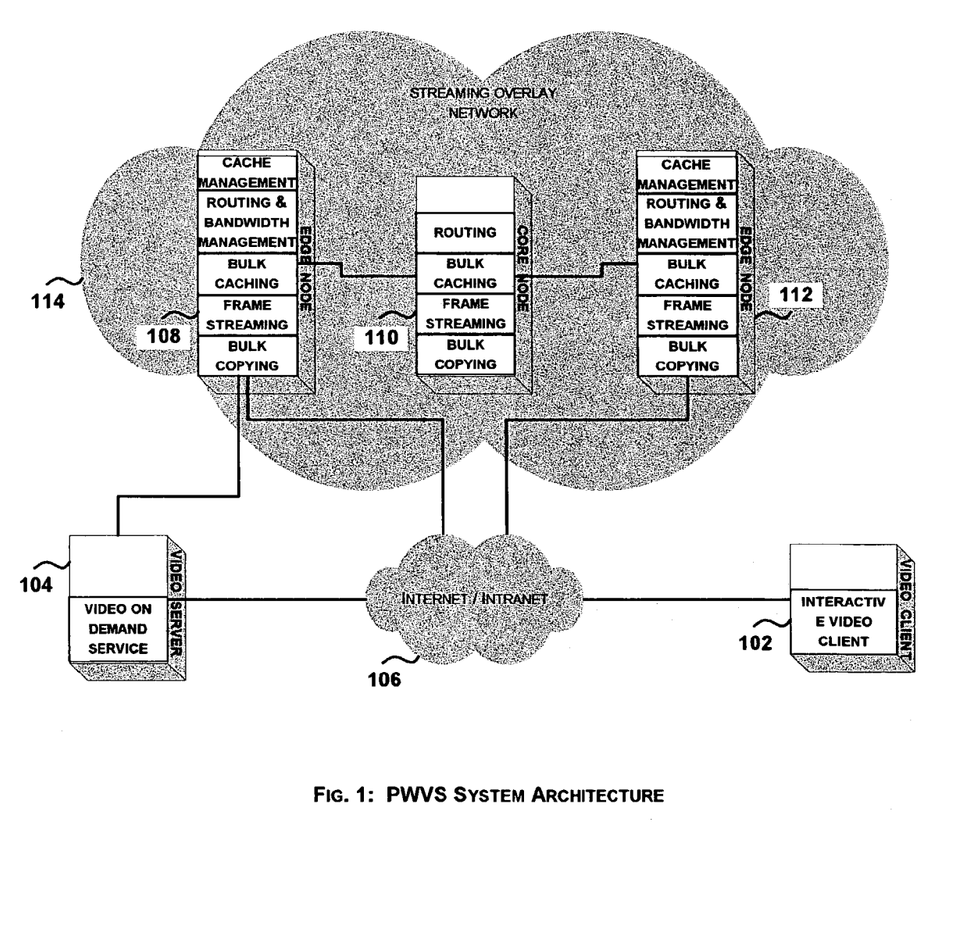
FIG. 1 describes an overall system architecture of PWVS system.

FIG. 1 describes an overall system architecture of PWVS system. The main component of the system is the Streaming Overlay Network (SON). The SON is a dedicated network to efficiently meet real-time demands for video. A VoD service needs to address the QoS aspects the service such as time to start streaming and quality of video transmission. Both these QoS aspects are worst affected when the network is loaded and it is a real and big challenge for video service providers to adhere to Service Level Agreements (SLAs) under these trying conditions. There are two bottleneck points in the infrastructure used in streaming: (a) the network that transports video data; and (b) the host (video server) that is the source of the stream. The architecture proposed in FIG. 1 helps in overcoming these bottlenecks and in addressing the challenges head-on. The purpose of SON is to have a point of presence (PoP) as close to the video clients as possible and in the proposed architecture, such PoPs are used effectively during the network congestion and host congestion times to minimize the impact of the same on QoS of video service.

In order to stream a video from a server to a client, it is necessary to have a sufficient bandwidth (BW) for the entire duration of the video streaming. This calls for demanding bandwidth on network that can ultimately become a bottleneck. It has also been observed that while there is a congestion on some select routes in the network, the overall load on the network doesn't overload the network. The objective is to exploit this bandwidth availability without compromising on QoS. A typical video streaming consists of a sequence of frames to be streamed at an agreed upon frame rate. On account of this factor, not only this requires an end to end bandwidth but also a constant allocation of server resources. SON, a dedicated multi-node network, is positioned in between multiple servers and multiple clients to help reduce the load on both the network and servers. In the proposed architecture, a collection of edge nodes manage the overall bandwidth available within SON by appropriately loading the various core nodes.

On receiving a client request for a video, the video server interacts with a configured source edge node of the SON. Similarly, the client is configured to receive video data from a target edge node of the SON. The approach is to get the video as quickly as possible to the target edge node so that the chances of network and video server congestion affecting the video transmission is greatly reduced. At the same time, it is important to initiate streaming of the video to the client as early as possible. Both these factors are achieved by the source edge node by (a) streaming the video to the client through an IP network such as Internet or intranet, and (b) initiating the transfer of the video file from the source edge node to the target edge node. While the streaming is in progress, the source edge node identifies a best possible path with the best possible bandwidth to a best possible intermediate core node that is in the direction of the target edge node and transfers the video data in a shortest possible time. The idea is, instead of compromising for a low bandwidth end-to-end path from the source edge node to the target edge node, to determine piecewise maximal (from the point of view of bandwidth) sub-paths and transfer the video file using these maximal sub-paths. This exploits the available bandwidth within SON in a flexible way and at the same time attempts to reduce the overall video file transfer time. Note that this transfer is not affected by the agreed upon frame rate for video streaming.

Another important aspect of the proposed system is cache management. As more and more video files get transferred to edge nodes, during such transfers, the video files get stored and forwarded by multiple core nodes. All the nodes in SON have adequate storage infrastructure to store and forward video files and hence this storage can be used to effectively to increase the overall throughput. This is achieved by managing the store as a cache and retaining those video files in the storage that are likely to be accessed. When there is a need for accommodating additional video files, those video files in the cache that are least recently accessed are removed from the store to make room for new video files. As a consequence of distributed cache across the nodes of the SON, a client video request is analyzed to determine the best possible core or edge node that can be used to address the client demand. Specifically, if the video being requested is already present in an edge node that is closest to the client, then it is a simple matter to start the video streaming with the least overhead. On the other hand, if the requested video is present in one of the core nodes, then video streaming and video transferring are started from this core node simultaneously instead from a source edge node, thereby enhancing the throughput.

The edge nodes not only load the core nodes but also maintain the status of various core nodes and their associated links. This is facilitated by the self-monitoring aspect of the core nodes and these nodes communicate health messages at regular intervals to the edge nodes. Also, a core node monitors its neighbors and communicates their status to the edge nodes. In order to ensure that these health messages reach edge nodes, a portion of the network bandwidth is kept aside for this purpose. Using this and additional topological information, each edge node is in a position to arrive at a available bandwidth matrix that indicates the amount of bandwidth available at any point in time between any pair of nodes. Note that this bandwidth is an aggregated bandwidth across multiple links of a node. Whenever piecewise maximal sub-paths are determined to transfer video files, this information is updated onto the available bandwidth matrix and also communicated to the rest of the edge nodes to maintain a consistent BW availability information. Since this is a crucial requirement, this is addressed in the proposed architecture by (a) reserving bandwidth along the paths connecting the edge nodes into a ring topology, and (b) using token based updation of available bandwidth matrix. The first requirement is met by an explicit bandwidth reservation while the second requirement is met by selecting one of the edge nodes to act as a token manager. The rest of the nodes interact with this selected edge node to obtain the token before updating the available bandwidth matrix.

In order to effectively identify piecewise maximal bandwidth sub-paths that together provide an end-to-end path between source and target edge nodes, it is proposed to use the location information. Specifically, each node has a location attribute that is the physical location of the node. This is used in identifying intermediate core nodes that are in the direction of the target node from the source node, thereby identifying the best possible core nodes.

An interactive video client (102) interacts with a video server (104) via an IP network such as Internet/intranet (106) to request for a video. This request is communicated to the source edge node (108) by the video server. The main components of an edge node (108 and 112) are: (a) Bulk Copying—to transfer a video file from a source node to a core node with an ultimate objective of reaching a target edge node; (b) Frame Streaming—to stream a video file from a node to a client and if the node is not a target node, then the streaming is till such time the video transfer to the target node is under progress while if it is the target node (112), then the streaming is till the completion of the video; (c) Bulk Caching—storing of a received video file in the local storage of a node for forwarding and streaming purposes; (d) Routing and Bandwidth Management—to maintain the status of the SON along with the bandwidth availability and connectivity information; (e) Cache Management—to manage the local store containing a collection of video files so as to ensure that the store contains the most likely needed video files. The main components of a core node (110) are: (a) Bulk Copying—to forward a video file contained in the local cache to another core node or to an edge node; (b) Frame Streaming—to stream a video file to a client via an edge node and an IP network such as Internet/intranet; (c) Bulk Caching—to store the received video files in the local storage for forwarding and streaming purposes; (d) Routing—to reserve bandwidth and route packets along a path. The network connecting edge nodes and core nodes is the streaming overlay network (114) that is a dedicated network to stream videos to clients in an effective manner.

Figure 2:
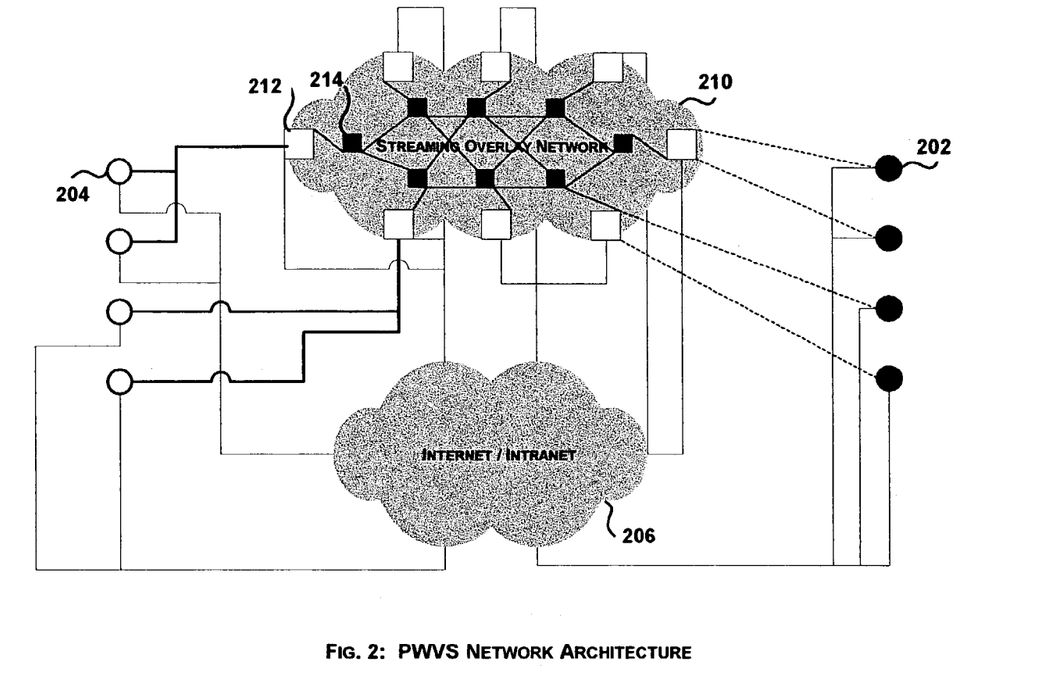
FIG. 2 describes a network architecture related to PWVS system.

FIG. 2 describes a network architecture related to PWVS system. The architecture depicts multiple video clients (202) connected to multiple video servers (204) through an IP network Such as Internet/intranet (206). In a typical video service, this is all could be the infrastructure. However, to overcome the various challenges and bottlenecks due to network and host congestion, a streaming overlay network is introduced as part of the PWVS network architecture (210). SON contains multiple edge nodes (212) and multiple core nodes (214). These edge and core nodes are interconnected yielding a particular network topology. Each video server is connected to an edge node of SON and further, each edge node is connected to the IP network.

Figure 2A:
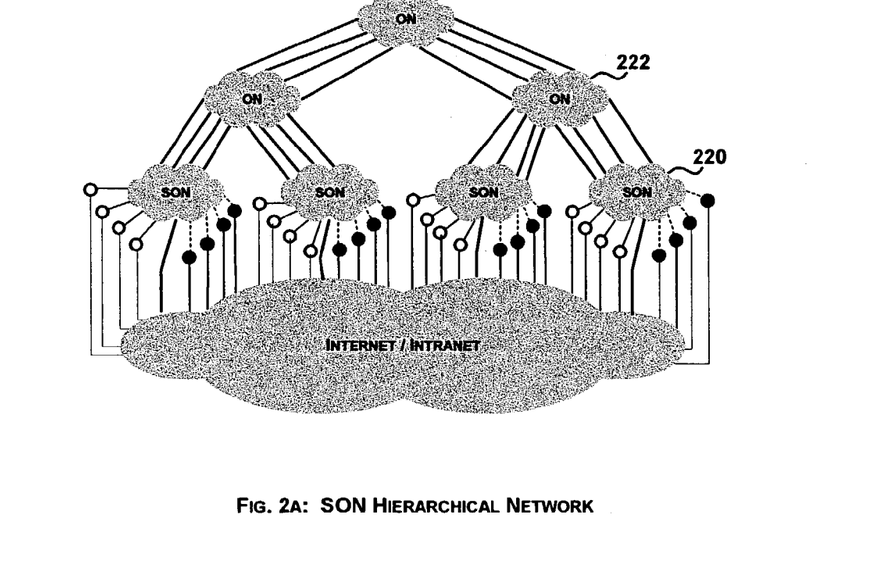
FIG. 2A describes a SON hierarchical network architecture.
Figure 3:
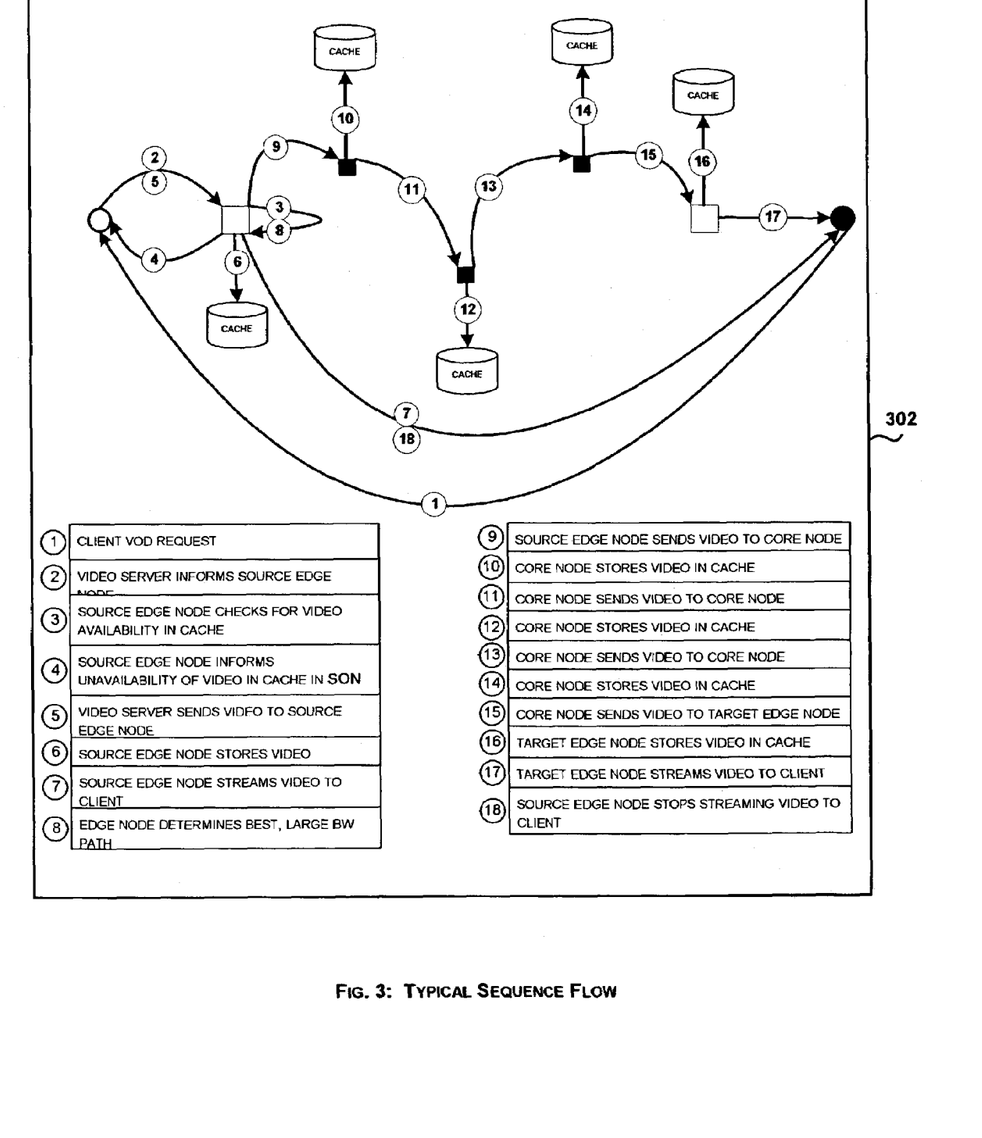
FIG. 3 depicts a typical sequence flow in PWVS system.

FIG. 2A describes a SON hierarchical network architecture. The suggested hierarchical extension supports scalability and also is a way of containing the complexity of individual SONs. In one of the preferred embodiments, video servers are connected to leaf SONs (220) while intermediate, non-SON nodes (222) are used to interconnect efficiently leaf SONs. Also, the edge nodes of leaf SONs that act as POPs for video clients are connected to an IP network such as Internet/intranet through which clients and servers are interconnected:

FIG. 3 depicts a typical sequence flow in the PWVS system. 302 describes a sequence related to the processing of a client request for a video when that video is not present in the SON distributed cache. In this case, the video server sends the video file to a source edge node, which in turn sends the video file, via multiple intermediate core nodes, to a target node. This target node is the POP node for the video client and the target node resumes video streaming to the client after the successful completion of transfer of the video file.

Figure 4:
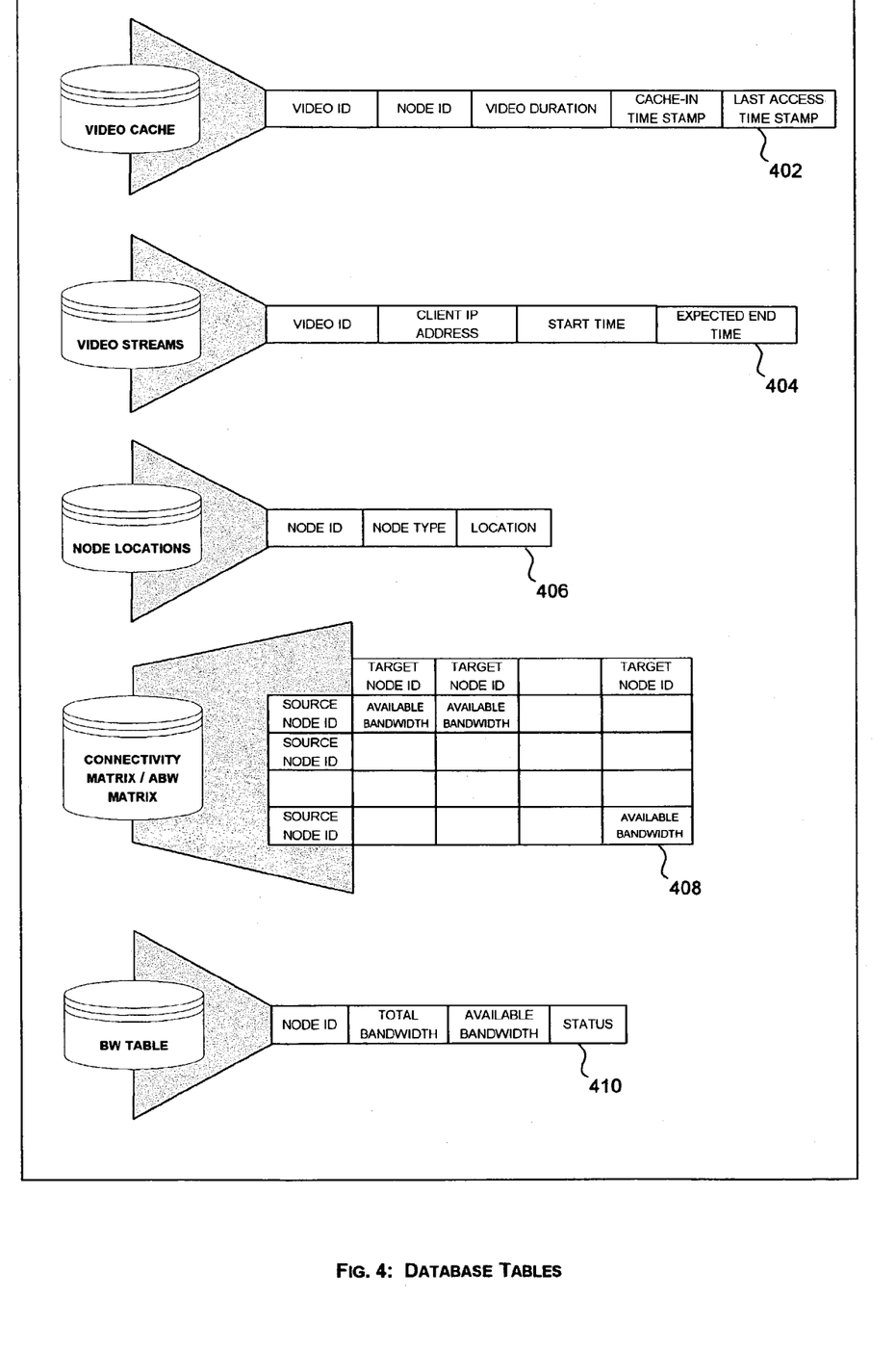
FIG. 4 depicts the schema of various database tables related to PWVS system.

FIG. 4 depicts the schema of various database tables related to PWVS system. 402 describes Video Cache table that contains information to manage cache. There are two variations of cache maintained in a distributed manner in SON: edge cache and core cache. 404 describes Video Streams table providing information related video streaming by edge and core nodes to various clients. The clients are identified by their IP address. 406 describes Node Locations table that contains information related to physical location of various core and edge nodes. Node type explicitly identifies a node as either core or as edge node. 408 describes Connectivity/Available Bandwidth Matrix. This table contains the most recent information related to the bandwidth availability between any two neighboring nodes. 410 describes BW Table that provides a node-wise consolidated information regarding total and available bandwidth.

Figure 5:
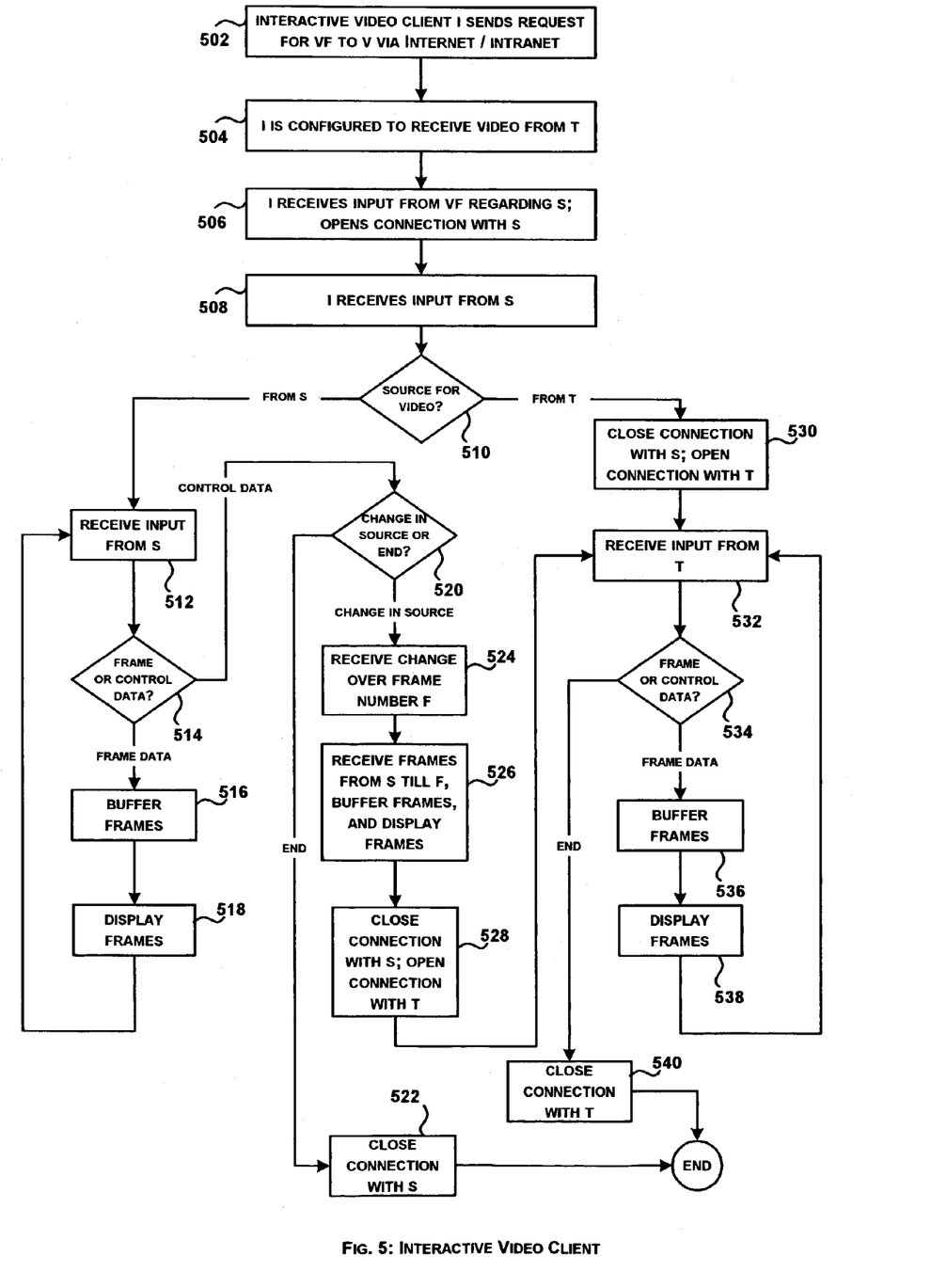
FIG. 5 depicts the steps involved in receiving and displaying video data by a video client.

FIG. 5 depicts the steps involved receiving and displaying video data by a video client. Interactive video client I sends request to a video server V for a video VF (502). I is configured to receive video from an edge node T of the SON (504). I receives input from VF regarding the edge node S of the SON and opens connection with S (506). On receiving input from S (508), I checks whether source of video is S or T (510). If the source is from S where S is an edge node of the SON related to V, I receives input from S (512) and checks whether input data is a frame data or control data (514). If it is a frame data, the received frame data is buffered (516) and the buffered data is used for displaying (518). The steps 512 through 518 are repeated till control data is received from S. On the other hand, if the control data is received (514) and if the received control data indicates end of data (520), I closes the connection with S (522). Otherwise, a check is made to determine if the data is related to informing a change in source of video (520). If it is so, the change over frame number F is received from S (524). I receives, buffers, and displays frames till frame F−1 is received (526). I closes the connection with S and opens connection with T (528). By default, I is configured to received video data from the edge node T. Frame F onwards is received from the node T. On the other hand, if the input received from S indicates that the source of video is T (510), I closes connection with S and opens connection with T (530) and I receives input from T (532). A check is made to determine whether the received input is frame data (534). If so, the received data is buffered (536) and displayed (538). The steps 532 through 538 are repeated till the completion of streaming of VF. On the other hand, if the received input is control data signaling end (534), I closes the connection with T (540).

Figure 5A:
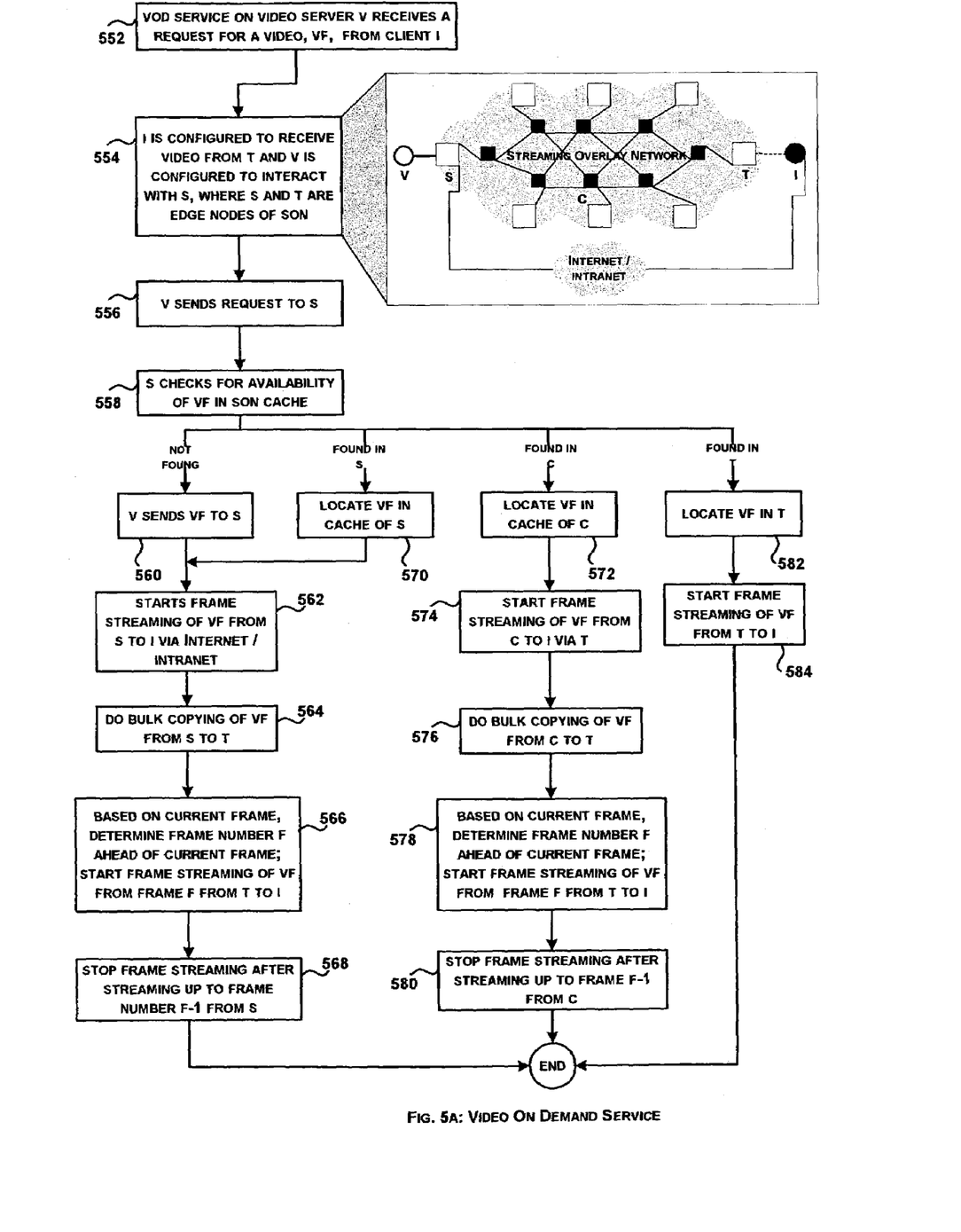
FIG. 5A describes the steps involved in servicing of a video demand from a client.

FIG. 5A describes the steps involved in servicing of a video demand from a client. VoD service on a video server V receives a video demand request from a client 1 (552). I is configured to receive video from T and V is configured to interact with S where S and T are edge nodes of the SON (554). On receiving request from I, V sends request to S to determine whether the video VF is already present in the distributed cache of the SON (556). S checks for the availability of VF in the SON cache (558). If VF is not found in the cache, S informs the same to V and V sends VF to S (560). S stores the received video file VF and starts streaming VF to I via Internet/intranet (562). Simultaneously, VF is bulk copied to T that is close to I as quickly as possible (564). As frame streaming to I is under progress from S, based on current frame, S determines frame number F ahead of the current frame and communicates the current frame number, time stamp, and F to T to initiate the streaming to I from F (566). T computes the time at which to start the streaming from frame number F onwards based on the received current frame number, time stamp, frame rate, and F, and starts streaming to I. S stops streaming after streaming up to frame F−1 from S (568). On the other hand, if VF is located in cache of S (570) and processing continues from step 562 onwards. If VF is located in a core node C of the SON (572), S locates VF in cache. C starts frame streaming of VF to I via T that is close to 1 (574). Simultaneously, C bulk copies VF to T (576). As frame streaming to I is under progress from C, based on current frame, C determines frame number F ahead of the current frame and communicates the current frame number, time stamp, and F to T to initiate the streaming to I from F (578). T computes the time at which to start the streaming from frame number F onwards based on the received current frame number, time stamp, frame rate, and F, and starts streaming to I. C stops streaming after streaming up to frame F−1 to I (580). If VF is located in T (582), T starts frame streaming of VF to I (584).

Figure 6:
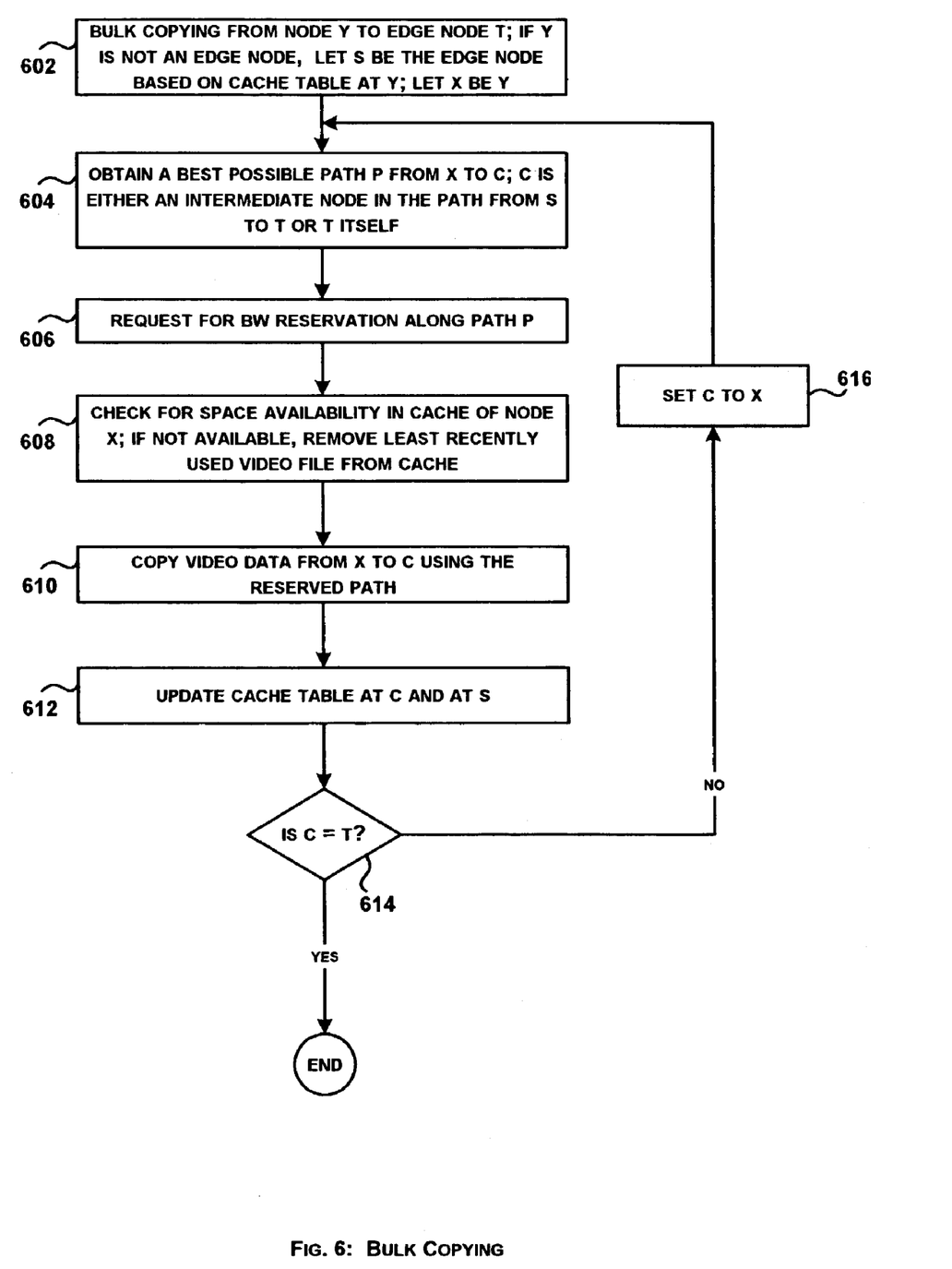
FIG. 6 depicts the steps involved in bulk copying.

FIG. 6 depicts the steps involved in bulk copying. Bulk copying refers to activity of transferring the video file being streamed to a client to an edge node (PoP node), on the SON that is as close to the client as possible, as quickly as possible. The objective is to continue streaming of the video file to the client from the PoP node once the transfer is successfully completed. Bulk copying makes best use of the network infrastructure thereby enhancing the return on investment. The described procedure achieves bulk copying of a video file from a node Y to a target edge node T (602). If Y is not an edge node, let S be an edge node based on cache table at node Y indicating that the video file being bulk copies was originally sourced to Y from S, otherwise let S be Y. Let current node be Y. Obtain a best possible path P from the current node to node C (604). The node C can either be an intermediate core node or edge node T. The best path is based on the maximum bandwidth that can be obtained for path P that is in the direction of T. Request for bandwidth reservation along path P so that the video file can be copied using this allocated bandwidth as quickly as possible (606). Check for space availability to store in the incoming video file in the node C (608). If sufficient space is not available, remove the least recently used video file from the store to make room for the incoming file. Copy video data from the current node to C using the reserved path (610). Update cache table at C and S (612). Edge node S maintains the distributed cache across the core nodes so that the availability of a video file in the distributed cache can be easily checked. If C is not the target node T (614), then set the current node as C (616) and perform from step 604 onwards.

Figure 7:
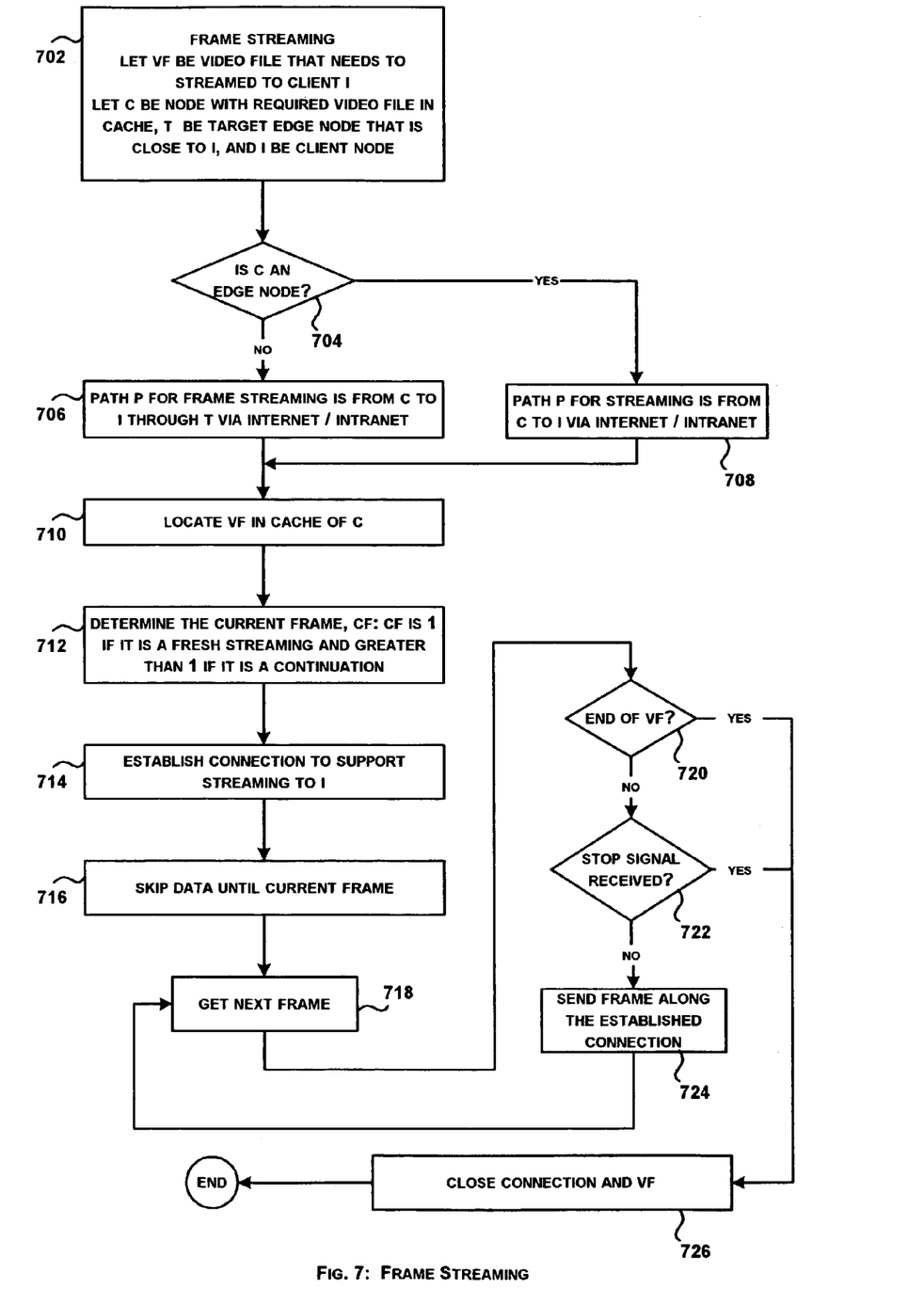
FIG. 7 describes the steps involved in frame streaming.

FIG. 7 describes the steps involved in frame streaming. Frame streaming refers to the activity of streaming a requested video file to a client and is done in two phases. In the first phase, that is done before bulk copying, frame streaming is from a non-PoP node to the client. This non-PoP node can either be an edge node or a core node. In the second phase, that is done after bulk copying, frame streaming is from a PoP node that is an edge node close to the client. Let VF be the video fie that needs to be streamed to the client 1 (702). Let C be node with the required video file in cache and T be that target edge node (PoP node) that is close to I. Check whether C is an edge node (704). If C is not an edge node, the path P for frame streaming is from C to I through T via an IP network such as Internet/intranet (706). This is because T is the edge node that is close to I. On the other hand, if C is an edge node, then the path P used for streaming is from C to I via Internet/intranet (708). Locate VF in cache of C (710). Determine the current frame CF (712). CF is I if the streaming is a fresh streaming from the beginning of the video file and is greater than 1 if the streaming is a continuation streaming. Note that the second phase frame streaming is typically a continuation streaming. Establish a connection to support streaming to the client I along the path P (714). Skip data until current frame data is obtained (716). Get next frame (718). If end of VF is not reached (720) and stop signal has not been received (722), send the frame along the established connection (724) and steps 718 through 724 are repeated. Note that the stop signal is received during phase I frame streaming when it is required to switch streaming transparently from one node to another edge node. On the other hand, if end of VF is reached (720) or stop signal has been received (722), then close the connection and VF (726).

Figure 8:
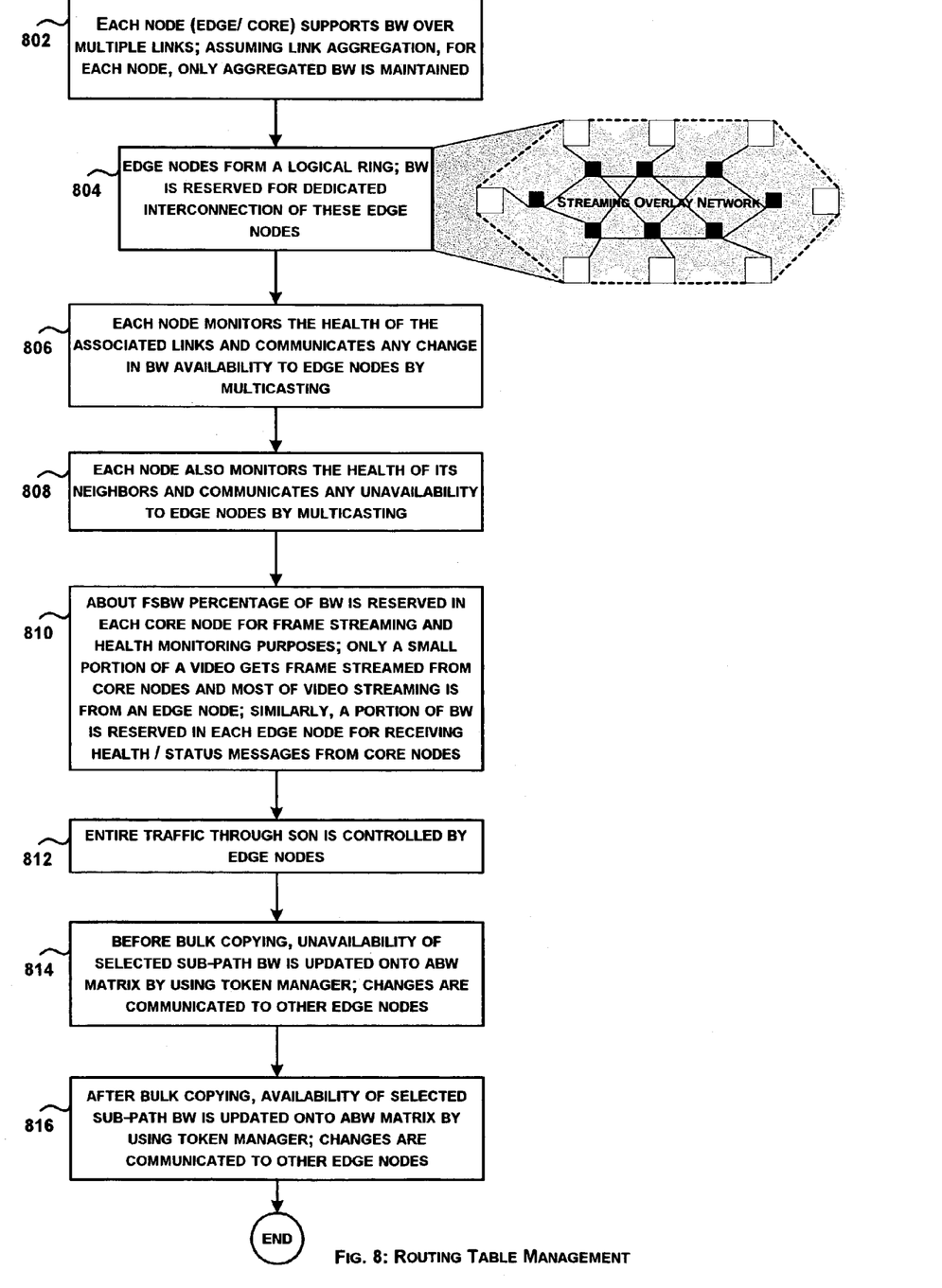
FIG. 8 describes the various factors involved in routing table management.

FIG. 8 describes the various factors involved in routing table management. Each node, edge or core, has one or more links and these links interconnect the nodes of the SON (802). The aggregate capacity of the links of a node is the total bandwidth provided by that node. Assuming link aggregation while transporting data across multiple links to a neighboring node, it is adequate to maintain only the link aggregated bandwidth. The Connectivity/Available Bandwidth Matrix (ABW), maintained by each edge node, contains the available bandwidth between a pair nodes that are directly connected via a link. Edge nodes of the SON form a logical ring (804). In order to facilitate efficient transmission of data among edge nodes, the required bandwidth is reserved for interconnection of these edge nodes. The bandwidth contained in the connectivity/ABW matrix doesn't include the reserved bandwidth and is used solely for bulk copying purposes. The available bandwidth is dependent on status of links and nodes, and this status needs to be tracked continuously to maintain an accurate estimate of the available bandwidth. Each node monitors the health of the associated links and communicates any change in BW availability to edge nodes by multicasting (806). Further, each node also monitors the health of its neighbors and communicates any unavailability to edge nodes by multicasting (808). In order to ensure that these health and status messages reach the edge nodes, required bandwidth is kept reserved in each node for this purpose. About FSBW percentage of BW is reserved in each core node for frame streaming and health monitoring/status message communication purposes (810). Only a small portion of a video gets frame streamed from a core node to a client node and most of the video streaming to the client node occurs from a PoP (edge) node. Similarly, a small portion of BW is dedicated in each edge node for receiving health/status messages from core nodes. The load on the SON is directly controlled by the edge nodes of the SON and these edge nodes keep track of the status of each of the core nodes such as available bandwidth and available cache space. Entire traffic through the SON is controlled by these edge nodes (812). Before bulk copying, the selected sub-path BW is updated onto ABW matrix (814). As ABW matrix is maintained at each edge node, it is essential to keep this matrix synchronized across the edge nodes. This is facilitated by using a token manager so that each edge node obtains the token, updates ABW matrix, communicates the changes to other edge nodes, and releases the token. Once the bulk copying is completed, the availability of the selected sub-path is updated onto ABW matrix (816). Again, in order to keep the ABW matrix synchronized, an edge node obtains the token, updates the ABW matrix, and releases the token.

Figure 9:
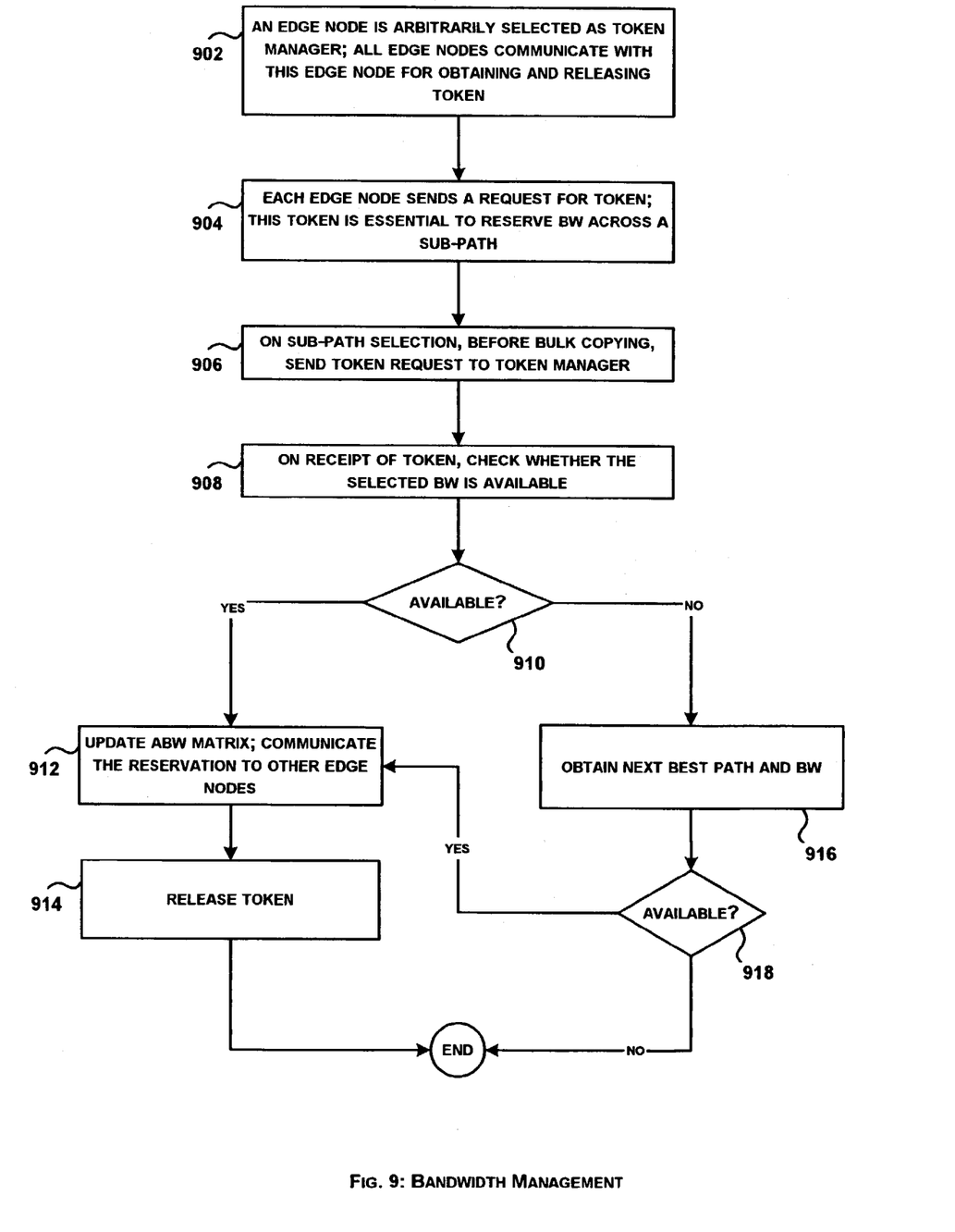
FIG. 9 describes the steps involved in bandwidth management.

FIG. 9 describes the steps involved in BW management. BW management involves maintaining an accurate information on the available bandwidth and ensuring that bandwidth doesn't get over-allocated. This is achieved by selecting an edge node arbitrarily as token manager and all the edge nodes communicate with this edge node for obtaining and releasing the token (902). The token manager assures that the token is granted to only one edge node at any point in time, thereby preserving the integrity of the ABW matrix. Each edge node sends a token request to the token manager (904). This token is essential to reserve the bandwidth across a sub-path. On-sub-path selection, before the initiation of bulk copying, send a token request message to the token manager (906). On receipt of the token, check whether the required bandwidth along the selected sub-path is available (908). If available (910), update the ABW matrix and communicate the changes in the ABW matrix to the other edge nodes (912). And, release the token back to the token manager (914). On other hand, if sufficient BW is not available (910), obtain the next best path and BW (916). If available (918), perform from the step 912 onwards.

Figure 10:
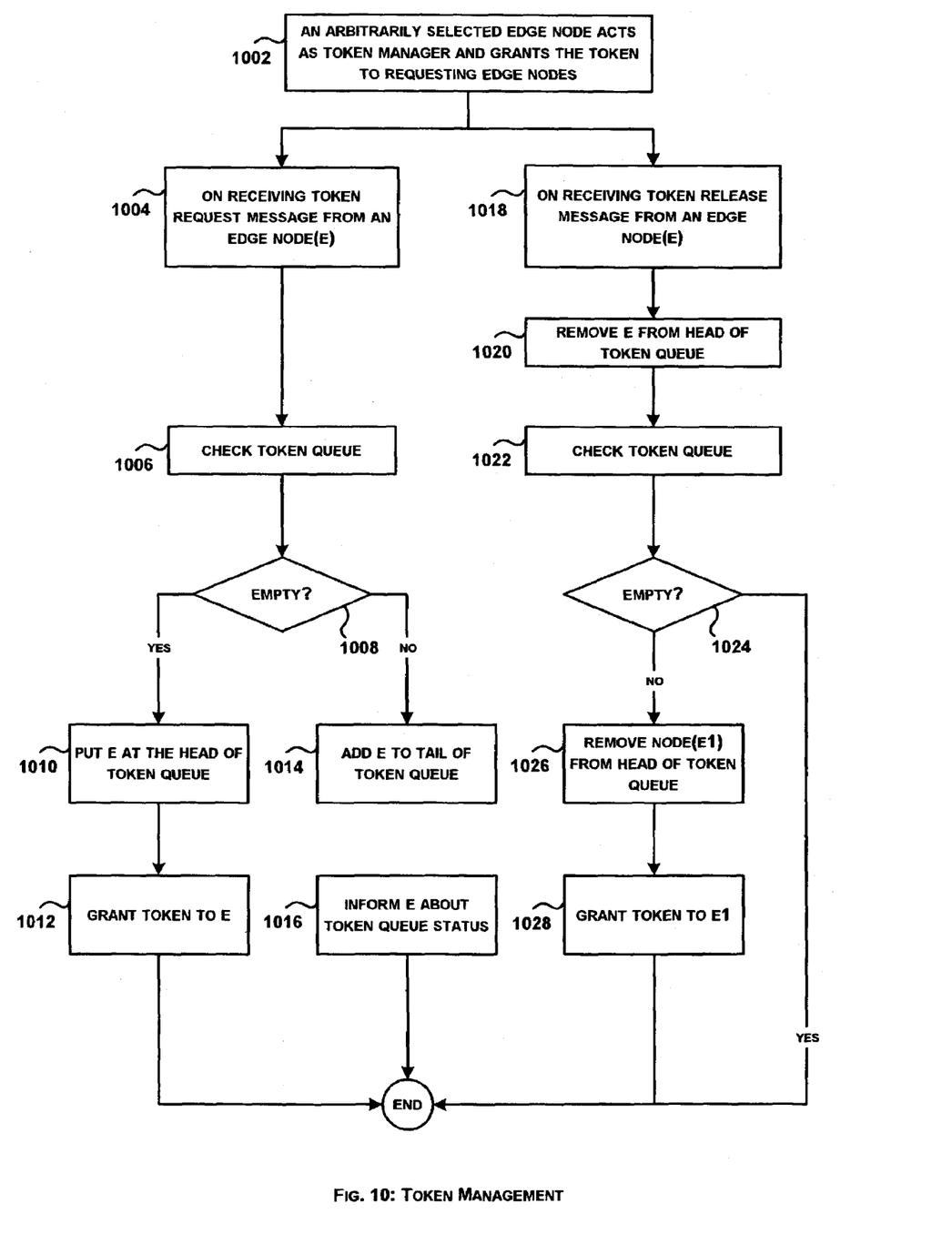
FIG. 10 describes the steps involved in token management.

FIG. 10 describes the steps involved in token management. An arbitrarily selected edge node acts as a token manager and grants the token to the requesting edge node (1002). Token manager receives two kinds of messages: Token request message and Token release message. On receiving token request message from an edge node E (1004), check the token queue (1006). If the token queue is empty (1008), put E at the head of the token queue (1010). Grant the token to E (1012). On the other hand, if the token queue is not empty (1008), add E to the tail of token queue (1014). Inform E about the token queue status (1016). On receiving token release message from an edge node E (1018), remove E from head of the token queue (1020). Check the token queue (1022). If the token queue is not empty (1024), remove node E1 from head of the token queue (1026) and grant token to E1 (1028).

Figure 11:
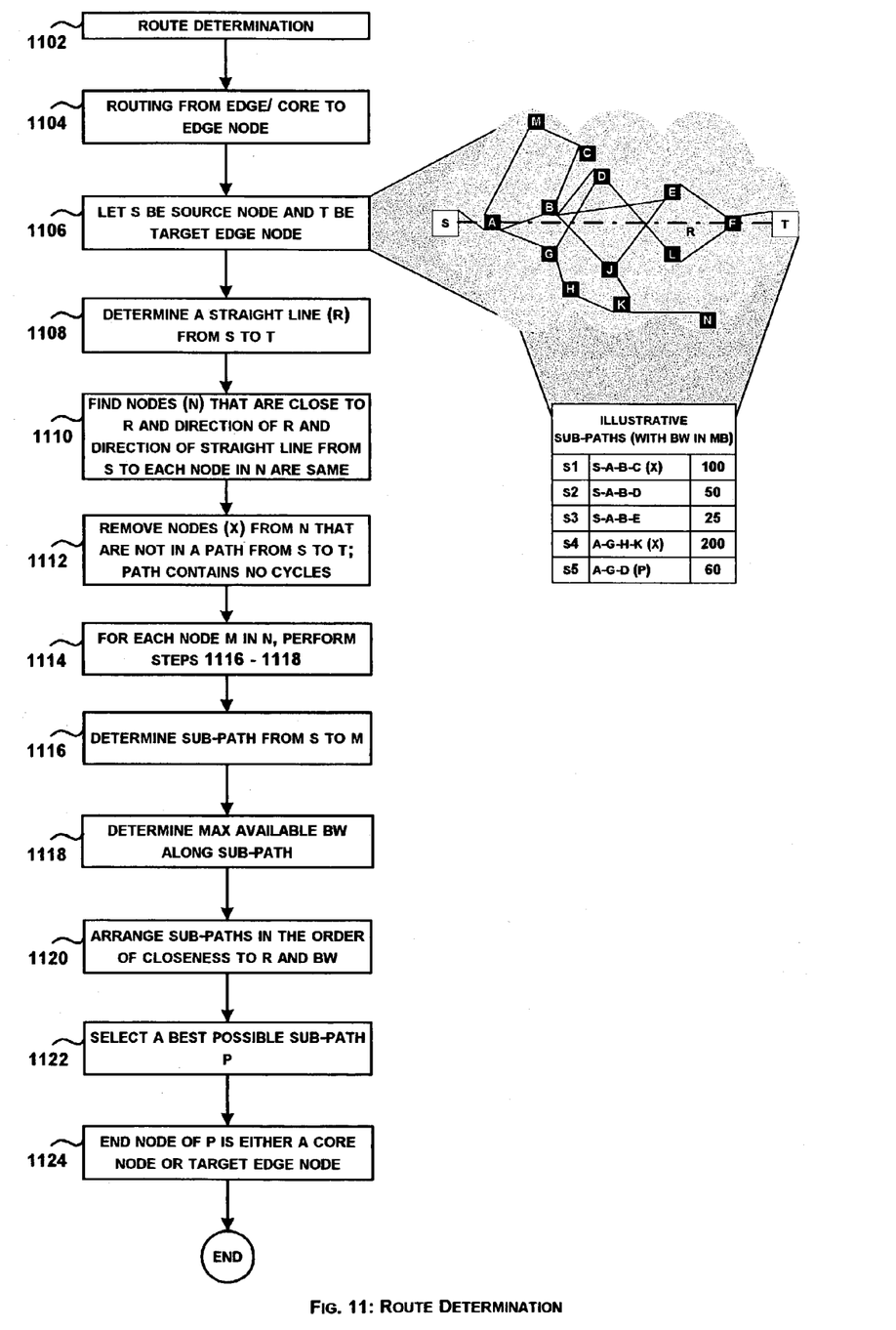
FIG. 11 describes the steps involved in determining a route from a source node to a target edge node.

FIG. 11 describes the steps involved in determining a route from a source node to a target edge node. The route determination involves identifying a best possible sub-path from a given node towards the target edge node with as much bandwidth as possible. Steps 1104 through 1126 describe the sub-path identification procedure (1102). The best sub-path to be determined is to determine a route from either an edge or a core node to an edge node (1104). Let S be source node and T be the target edge node (1106). Determine a straight line (R) from S to T (1108). Find the nodes (N) such that each node N1 in N is close to the straight line R and the direction of R and the direction of straight line from S to N1 are the same (1110). Remove nodes (X) from N that are not in the path from S to T (1112). Note that the path doesn't contain any cycles. For each node M in N, perform the steps 1116 through 1118 (1114). Determine a sub-path from S to M (1116). Determine the maximum available BW along the sub-path (1118). Arrange the determined sub-paths in the order of closeness to R and on BW (1120). Select a best possible sub-path P (1122). The end node of P is either a core node or the target edge node T (1124).

Figure 12:
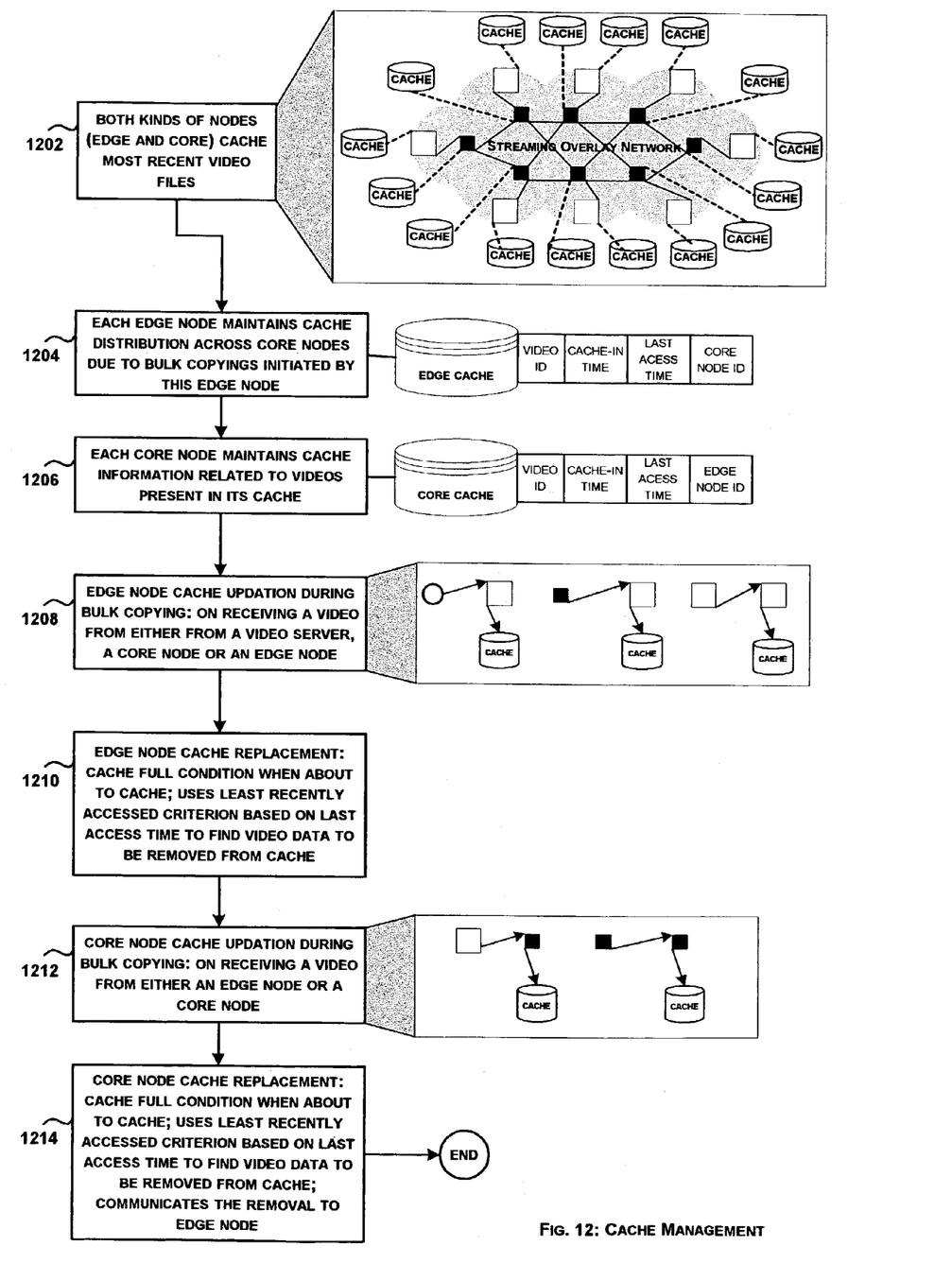
FIG. 12 describes the various factors involved in video file cache management.

FIG. 12 describes the various factors involved in video file cache management. The distributed caching is undertaken to achieve the objective of streaming videos, from the edge nodes of the SON to the client nodes, with a least demand on the network bandwidth. Both edge nodes and core nodes cache the most recent video files (1202). Each edge node maintains the cache distribution across the core nodes due to the bulk copying initiated by this edge node (1204). This cache is called as edge cache. The edge node also stores the core node ID as part of the cache so that whenever a request is received for streaming a video file and it is located in the distributed cache, the edge node instructs the corresponding core node to address the streaming requirement. Each core maintains the cache information related to the most recent videos received by the core node (1206). This cache is called core cache. The core node also stores ID of the edge node that directly or indirectly initiated the bulk copy of the corresponding video data. Edge node, on receiving a video data either from a video server, from a core node, or from an edge node, updates its cache store (1208). During cache updation, if it is observed that the cache is full, the least recently accessed criterion based on last access time is used to find the video data to be removed from the cache to make room for the incoming new video data (1210). Core node, on receiving a video data either from an edge node or from a core node, updates its cache store (1212). During cache updation, if it is observed that the cache is full, the least recently accessed criterion based on last access time is used to find the video data to be removed from the cache to make room for the incoming new video data (1214). The fact that a video data has been removed from the cache is informed to the edge node that either directly or indirectly bulk copied the video data to the core node.

Thus, a system and method for effectively utilizing server resources by streaming video from the edge nodes of a dedicated streaming overlay network and network infrastructure by using the location based bandwidth allocation and management, and piecewise streaming has been disclosed. Although the present invention has been described particularly with reference to the figures, it will be apparent to one of the ordinary skill in the art that the present invention may appear in any number of systems that maximize the utilization of resources used in video streaming. It is further contemplated that many changes and modifications may be made by one of ordinary skill in the art without departing from the spirit and scope of the present invention.

ACRONYM LIST

| | | |
|---|---|---|
| 1. ABW | Available Bandwidth |
| 2. BW | Bandwidth |
| 3. FSBW | Frame Stream Bandwidth |
| 4. ON | Overlay Network |
| 5. PoP | Point of Presence |
| 6. PWVS | Piecewise Video Streaming |
| 7. SLA | Service Level Agreements |
| 8. SON | Streaming Overlay Network |
| 9. VoD | Video on Demand |

What is claimed is:

1. A piecewise video streaming system for maximizing the utilization of network resources of a network with a plurality of nodes comprising a plurality of edge nodes and a plurality of core nodes to meet quality of service requirements under loaded conditions of said network, said piecewise video streaming system comprising a method for streaming a video file from a source edge node of said plurality of edge nodes to a target edge node of said plurality of edge nodes via a plurality of intermediate core nodes of said plurality of core nodes by simultaneous frame streaming and bulk copying of video data associated with said video file through (a) said source edge node streaming a portion of said video file to said target edge node (STREAMING); (b) said source edge node copying a portion of said video file to said target edge node (COPYING); (c) said source edge node determining a plurality of near piecewise maximal nodes of said plurality of core nodes and copying a portion of said video file to each of said plurality of near piecewise maximal nodes (BULK-COPYING); and (d) each of said plurality of piecewise maximal nodes repeating simultaneous frame streaming and bulk copying of associated video data of said video file.

2. The system of claim 1, wherein said method further comprises means for determining the location of each of the said plurality of nodes of said network, wherein said determining is based on geographical location of each of said plurality of nodes.

3. The system of claim 1, wherein said method further comprises means for determining a near piecewise maximal node of said plurality of core nodes for a node of said plurality of nodes, wherein said determining comprises: determining of a target straight line from said node to said target edge node; determining a plurality of neighboring nodes that are close to said target straight line; determining a plurality of sub-paths from said node to each of said plurality of neighboring nodes having as much available bandwidth as possible; ordering of said plurality of sub-paths based on closeness to said straight line and available bandwidth; selecting a best possible sub-path from said plurality of sub-paths; and selecting the end node of said best possible sub-path as said near piecewise maximal node.

4. The system of claim 3, wherein said method further comprises means for piecewise streaming of said video file from said source edge node to said target edge node, wherein said piecewise streaming from said source edge node comprises: determining a plurality of near piecewise maximal nodes; starting stream copying of a portion of said video file from said source edge node to said target edge node; starting copying of a portion of said video file from said source edge node to each of said plurality of near piecewise maximal nodes; and computing and communicating expected time of streaming information to each of said plurality of near piecewise maximal nodes.

5. The system of claim 4, wherein said method further comprises means for stream copying a portion of said video file from a node of said plurality of nodes, wherein said stream copying comprises: starting streaming of a stream portion of said portion of video file from said node to said target edge node; copying a portion of said portion of said video file from said node to said target edge node; and handing off streaming to said target edge node after streaming of a pre-computed number of frames of said stream portion of said portion of said video file.

6. The system of claim 4, wherein said method further comprises means for piecewise streaming from a near piecewise maximal node of said plurality of core nodes to said target node, wherein said piecewise streaming from said near piecewise maximal node comprises: receiving a portion of said video file from a node of said plurality of nodes, wherein said node is either a near piecewise maximal node of said network or said source edge node; receiving of expected time of streaming; locating of a plurality of near piecewise maximal nodes; starting of copying of a portion of said portion of said video file to each said plurality of near piecewise maximal nodes; computing and communicating of expected time of streaming information to each of said plurality of near piecewise maximal nodes; and starting of stream copying on demand.

* * * * *